(12) United States Patent
Schnieders et al.

(10) Patent No.: US 12,470,597 B1
(45) Date of Patent: Nov. 11, 2025

(54) AUTOMATED IDENTIFICATION OF INTERNET HUMAN IMPERSONATORS

(71) Applicant: Morgan Stanley Services Group Inc., New York, NY (US)

(72) Inventors: William R. Schnieders, Laurel, MD (US); Naina Bharadwaj, New York, NY (US); Sandeep Ramesh, Kochi (IN); Rahul Suresh, Chennai (IN); Alisha Singh, New York, NY (US); Cheryl Fernandes, New York, NY (US); Dipesh Singh, Piscataway, NJ (US); Labdhi Shah, Ahmedebad (IN)

(73) Assignee: Morgan Stanley Services Group Inc., New York, NY (US)

( * ) Notice: Subject to any disclaimer, the term of this patent is extended or adjusted under 35 U.S.C. 154(b) by 372 days.

(21) Appl. No.: 18/295,923

(22) Filed: Apr. 5, 2023

(51) Int. Cl.
*H04L 9/40* (2022.01)

(52) U.S. Cl.
CPC ...... *H04L 63/1483* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 8,056,128 B1 | 11/2011 | Dingle et al. | |
| 2007/0094500 A1 | 4/2007 | Shannon et al. | |
| 2016/0063218 A1 | 3/2016 | Nachenberg | |
| 2018/0337947 A1 | 11/2018 | Schiffman | |
| 2020/0401728 A1 | 12/2020 | Lockhart, III et al. | |
| 2021/0160280 A1* | 5/2021 | Yadav | G06F 18/24137 |
| 2021/0160281 A1 | 5/2021 | Hallaji et al. | |
| 2021/0203693 A1* | 7/2021 | Clausen | H04L 63/1425 |
| 2022/0201036 A1 | 6/2022 | Nabeel et al. | |
| 2024/0250987 A1* | 7/2024 | Annapureddy | H04L 63/1483 |

* cited by examiner

*Primary Examiner* — Farid Homayounmehr
*Assistant Examiner* — Suman Debnath
(74) *Attorney, Agent, or Firm* — K&L Gates LLP

(57) ABSTRACT

Systems and methods for detecting human impersonations on the internet, comprising receiving, by an ingestion layer of a detection system, a plurality of web data; filtering, by a processing engine of the detection system, the plurality of web data to identify relevant websites; extracting, via a scoring engine of the detection system, categories of data of a website of the relevant websites; assigning a score, via the scoring engine, for each category of the categories of data; and determining a risk score for the website, via the scoring engine, based on the score for each category.

21 Claims, 9 Drawing Sheets

Domains Individual Summary

| | |
|---|---|
| Risk Score <u>601</u> | (96) |
| Domain <u>602</u> | janelisadoe.com |
| Action State <u>603</u> | non-actioned |
| Firm Name <u>604</u> | ACME company |
| First Name <u>605</u> | JANE |
| Middle Name <u>605</u> | LISA |
| Last Name <u>605</u> | DOE |
| Has Morgan Stanley Broker Details Availability <u>609</u> | Yes |
| <u>609</u> | Exact Match Found in https://brokercheck.finra.org/ |
| Ingested Timestamp <u>606</u> | 2022-10-06T17:00:00 |
| Links <u>607</u> | • #gallery<br>• #work<br>• https://www.instagram.com/janelisadoe/<br>• mailto:contact@janelisadoe.com<br>• https://t.me/+15415644436<br>• https://www.instagram.com/janelisadoe<br>• #gallery<br>• https://t.me/Jane_L_Doe<br>• mailto:contact@janelisadoe.com<br>• https://wa.me/+15415644436 |
| Tags <u>608</u> | • Finance Terms Present<br>• Finra BrokerCheck Link Found<br>• Firm Name Found<br>• Social Media Links Found<br>• Crypto Terms Found |

FIG. 6A

AUTOMATED IDENTIFICATION OF INTERNET HUMAN IMPERSONATORS

BACKGROUND

According to the 2021 FBI (Federal Bureau of Investigation) Internet crime report, investment scams surpassed romance scams to become the second most prevalent Internet crime, only lagging behind BEC (Business Email Compromise). Investment scams went from 8,788 complaints in 2020 to 20,561 complaints in 2021, while losses increased more than fourfold from $336M to $1.45B in 2021.

One form of investment scam is where a scammer impersonates an employee of a firm, particularly an employee in sales or retail. Presently, it is difficult to search for domains belonging to employees manually on a periodical basis because of a wide range of challenges. For example, names are not unique. Employees can have same names in different departments, and it becomes impractical to track each individual person. Also, the process becomes expensive because of the signals that need to be generated manually and the need for manual inspection of domains. Still further, the task becomes practically impossible if it needs to be extended to multiple firms at the same time.

SUMMARY

In a general aspect, embodiments of the present invention are directed to automated systems and methods that detect websites and domains that are directed to fraudulent activity out of a mass of newly created websites, domains and other web data on a daily basis. In most embodiments the systems deployed herein employ methods to ingest data, pre-process the data to make them suitable for filtering, running a first level filter to remove any web data, domains and websites that are irrelevant to the specific fraud or scam being targeted by the system and the extract metadata from the remaining websites to determine whether they are fraudulent websites. The system automates the method of extracting and collecting evidence of fraud, and automatically presenting them on a user interface to provide actionable digital documents. This allows automated digital documents to be used as evidence for takedowns of websites. The systems and methods herein leverage artificial intelligence and rules based algorithms to analyze and score websites and domains for fraudulent activity and generate evidence such as digital documents at a mass scale. These and other benefits that can be realized through embodiments of the present invention will be apparent from the description below.

FIGURES

Various embodiments of the present invention are described herein by way of example in conjunction with the following figures.

FIGS. 6A-6B illustrate user interfaces of a detection system, according to various embodiments of the present invention.

DESCRIPTION

Figure 1:
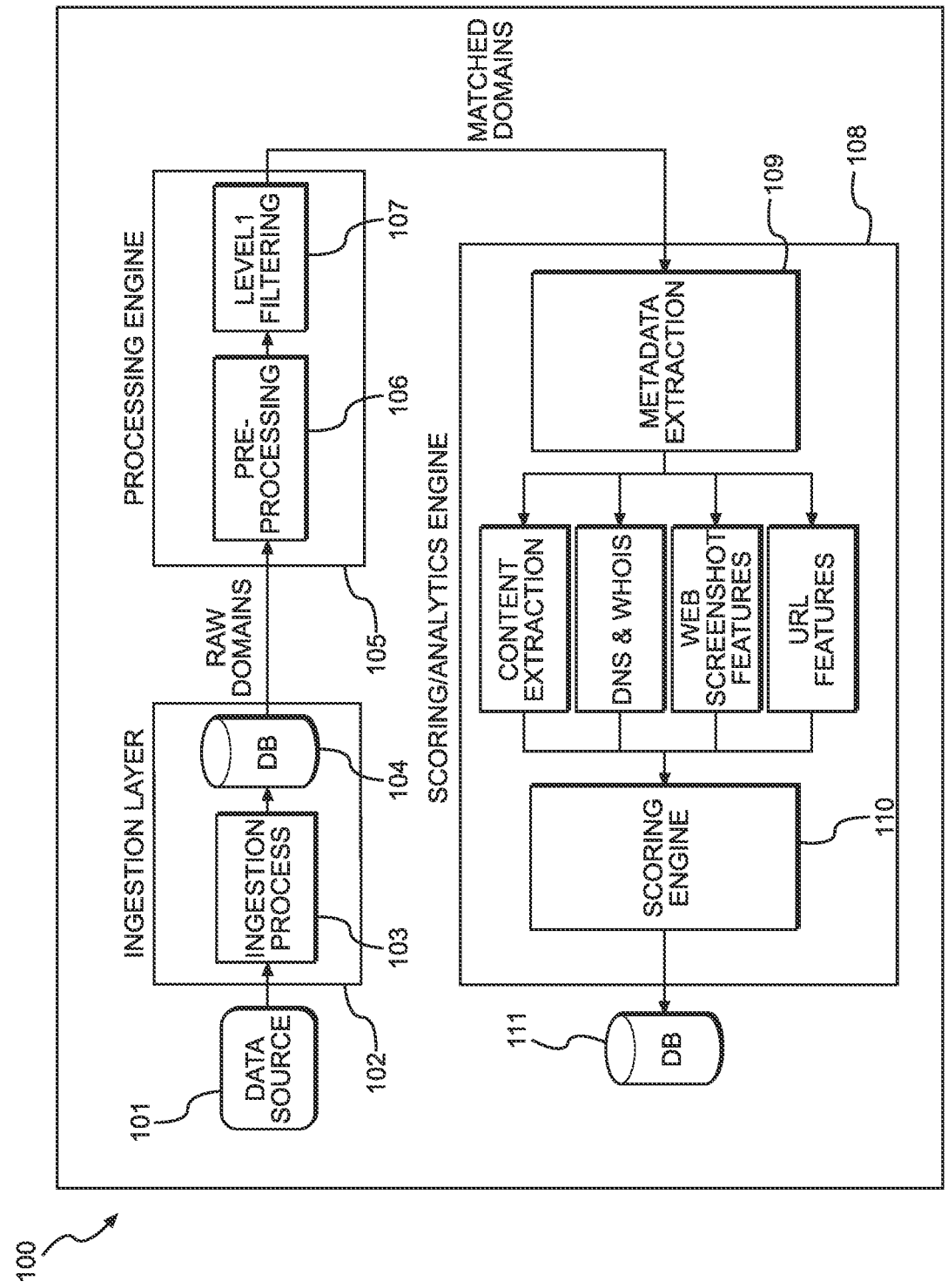
FIG. 1 is a block diagram of a generalized system to detect websites for perpetrating fraud, according to various embodiments of the present invention.

Impersonation of individuals, firms, and other entities via the use of fake websites and domain names used for the purpose of perpetrating scams is a recognized problem in the area of internet fraud. One particular form of impersonation, that of individuals, and specifically of employees, is particularly problematic. Employee impersonations occur in various industries in which employees need to work with digital footprints. This could extend to any firm and especially employees working in large firms, or in sales or client-facing roles, where reputation, internet presence, social media and other sources of digital footprint are essential to the role, such a financial advisors, real estate agents, lawyers, etc. Impersonating such employees aims to leverage the firm's brand to defraud potential clients and leads to reputational harm to both the employee as well as the firm involved.

Impersonation of individuals or employees can be done via fake domains and undertaken repeatedly at a very high pace, by creating new fake websites and domains on the internet at a mass scale. The scale and rapidity of the creation of such websites makes it particularly difficult to identify and detect fake domains. There is no one unique identifier that could be relied upon to identify fraudulent websites. For example, identifying domains via name matching cannot be exclusively relied upon because an employee may have a common name that cannot act as an identifier on its own.

Current technologies attempting to identify fraudulent websites usually look for brand related keywords, which fails to provide deep analysis and accurately assess websites as being fraudulent or not. The technologies presented herein are able to analyze various soft indicators in web data that are deemed suspicious based on the industry involved. For example, when attempting to detect websites that are undertaking crypto scams, the systems and methods herein will look specifically for crypto related keywords, social media tags, financial terms, firm names, or suspicious/deceiving patterns in websites.

The technologies presented also aim to solve the issue of changing patterns deployed by fraudulent websites and scammers to avoid detection. As scammers become more intelligent and develop new techniques, the technologies herein provide various methods of content extraction in combination with data analysis that can capture various types of patterns across several data categories and domains. For example, for detecting fraud in the crypto space, text analytics uncovers a multitude of key patterns for future improvements and extensions of the product.

The disclosure includes techniques to look to match employee names based on firm's personally identifiable information (PII) of employees and will tag the domains appropriately. It will also look out for employee names based on the content of the website to provide a broader context to the search and analysis. The methods and systems herein are able to be applied to all impersonations, regardless of a firm's size or number of employees. The techniques herein will therefore enable automatic detection, analysis, marking, flagging, and takedown of domains impersonating employees of the affected firm with the use of custom rule-based scoring mechanisms integrated to rank the suspicious domains and eliminating false positives encountered.

The solutions herein automatically collect evidence of online fraud and collates data, such that the solutions herein can also leverage machine learning and computer vision algorithms to identify deceiving patterns from both the picture of the website as well as the textual content to provide annotated evidence automatically for take downs. Automatically created evidence can include annotated full page website screenshots with highlighted stock photos, deceiving keywords, firm references, and customized fact checkers, a list of suspicious text phrases and keywords of interest that are high risk indicators, domain Metadata including WHOIS and DNS information, lists of all external links on the website, list of social media links/other external platform links on the website that might be used for impersonation, list of structurally similar websites based on the template of the website, and lists of other malicious websites coming from the same host name and other DNS related information. These may be displayed on user interfaces and annotated website screenshots and images as described herein.

Once the detection and takedown process has been completed, it is challenging to monitor all historically taken down domains considering the mass numbers and scale of numbers. The proposed solution can, in various embodiments, monitor these websites irrespective of when they were flagged and monitor semantically similar websites that arise in the future.

FIG. 1 is a block diagram of a generalized system to detect websites for perpetrating fraud, according to various embodiments of the present invention. System 100 includes the general architecture that can be implemented to achieve the methods disclosed herein. The detection system 100 may be implemented by one or a number of networked computers, such as described below. System 100 includes a data source 101 that stores web data, particularly for newly created websites and domain names. The web data, for example, can be from or provided by a data vendor or a service that provides a stream of data of domains, websites and other web data (these collectively referred to as "web data"). The data source can collect web data including URLs, websites, and domain names and have access to newly created websites and domain names. The data source 101 may be a vendor that provides web data to buyers. The data source 101 may provide or facilitate access to the data via an Application Programming Interface or API. The system 100 also includes an ingestion layer 102. Ingestion layer 102 receives web data from the data source 101 via an ingestion process 103 which feeds the received web data into an ingestion database 104 that receives and stores the ingested web data. In several embodiments. In various embodiments, during the ingestion process 103 only encrypted data is ingested, which is then decrypted before being stored in a database such as ingestion database 104.

The ingestion process 103 is a fault tolerant data ingestion pipeline. The web data may be stored as raw web data or domains in the ingestion database 104.

System 100 can also include a processing engine 105, which receives web data from the ingestion database 104, including websites and raw domains, and pre-processes them at block 106 them, and after pre-processing, the web data are filtered at block 107. A rule-based mechanism can be utilized to filter 107 the domains of concern. This can be undertaken via a scalable approach such as batch processing, which can be modified to meet evolving threats and fraud/impersonation techniques in websites and in web data. The filtering pipeline is customizable and scalable. It is also optimized for time as the identification and take-down of domains is time-sensitive. Pre-processing 106 may include sorting the domains, websites and other web data into categories, and preparing them to be filtered 107, for example by being removed, stored or taken out of the data set if they do not meet the filtering categories or criteria.

The filtering 107 matches the web data (and being pre-processed) to data (including web data) for the employees of the firm as a first step in detecting potentially fraudulent website that impersonate one of the employees. Web data or domains that pass the filtering 107 (also referred to herein as "matched domains"), for example because they are URLs that partially or fully match a predetermined string or alphanumerical combination set as part of filtering 107 mechanism, are sent to a scoring/analytics engine 108. The scoring or analytics engine 108 extracts metadata 109 including and not limited to textual content scraped from the matching websites, DNS and WHOIS information, and other domain registration information, web screenshot features, and URL features. Risk scores 110 can be applied by the scoring engine 108 with and/or without weightings to each of the extracted metadata, which then can be summed or otherwise combined to achieve a final risk score for each of the matched domains. The final risk score 110 then determines if it is above an acceptable threshold which determines whether the website/domain or other web data is used in fraudulent activities. The risk scores as well as the web data, websites or other extracted metadata for the matched domains (e.g., potentially fraudulent or impersonating websites) can then be saved in database 111.

Figure 2:
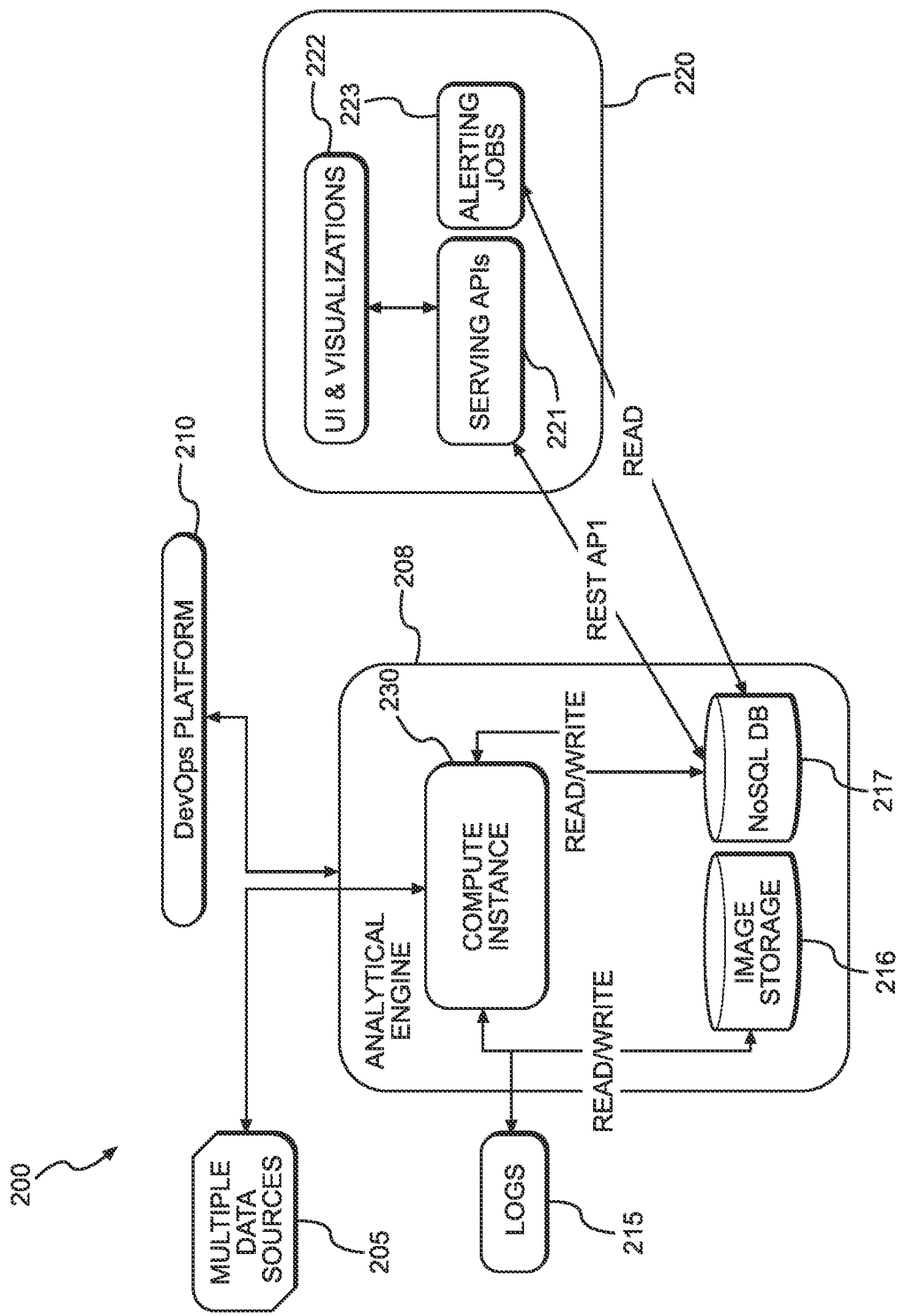
FIG. 2 illustrates a block diagram of a general architecture of a system to undertake the various methods described herein, according to various embodiments of the present invention.

FIG. 2 illustrates a block diagram of a general architecture of a system to undertake the various methods described herein, according to various embodiments of the present invention. System 200 may include one or more components of system 100 in FIG. 1. System 200 can include one or more data sources 205, which can be similar or identical to data source 101 of FIG. 1. Data sources 205 may feed web data, websites and domains into analytical engine 208, this may be similar to analytical engine 108 of FIG. 1. A devops platform 210 may be utilized to program and/or manage analytical engine 208. Continuous development, changes, and updates to analytical engine 208 are necessary, because new rules may have to be written as new categories of data, fraudulent or impersonation techniques, or of detection are formulated or come to the fore.

The analytical engine 208 may comprise various compute instances 230. The compute instances 230 may extract various types of data and metadata from the web data received. They may also compute weightings for each category of data, as well as compute initial pre-weighted risk scores, and then final weighted risk scores for each website or domain or other web data that is received from data source(s) 205. Logs 215 may be generated from the extraction of various types of metadata and/or of computing risk scores by compute instance 230. Extracted images may be stored in an image storage 216, and may be accessed by compute instance 230 whenever they are needed, for example for historical analysis or comparative techniques. Other content may also be stored in a database 217 and accessed when necessary.

A user interface module 220 may also be utilized by system 200 via a connection made with the analytical engine 208, and communication undertaken through a REST API or other communication channel. Various application programming interfaces or service APIs 221 may be used for various tasks, including to compute tasks and processes for user interfaces and visualizations 222 that can display various metrics or user interface tools to administrators or users of systems 100-200, FIGS. 1-2. Alerts 223 may also be generated based on the data that is stored in analytics engine 208 and specifically database 217.

Figure 3:
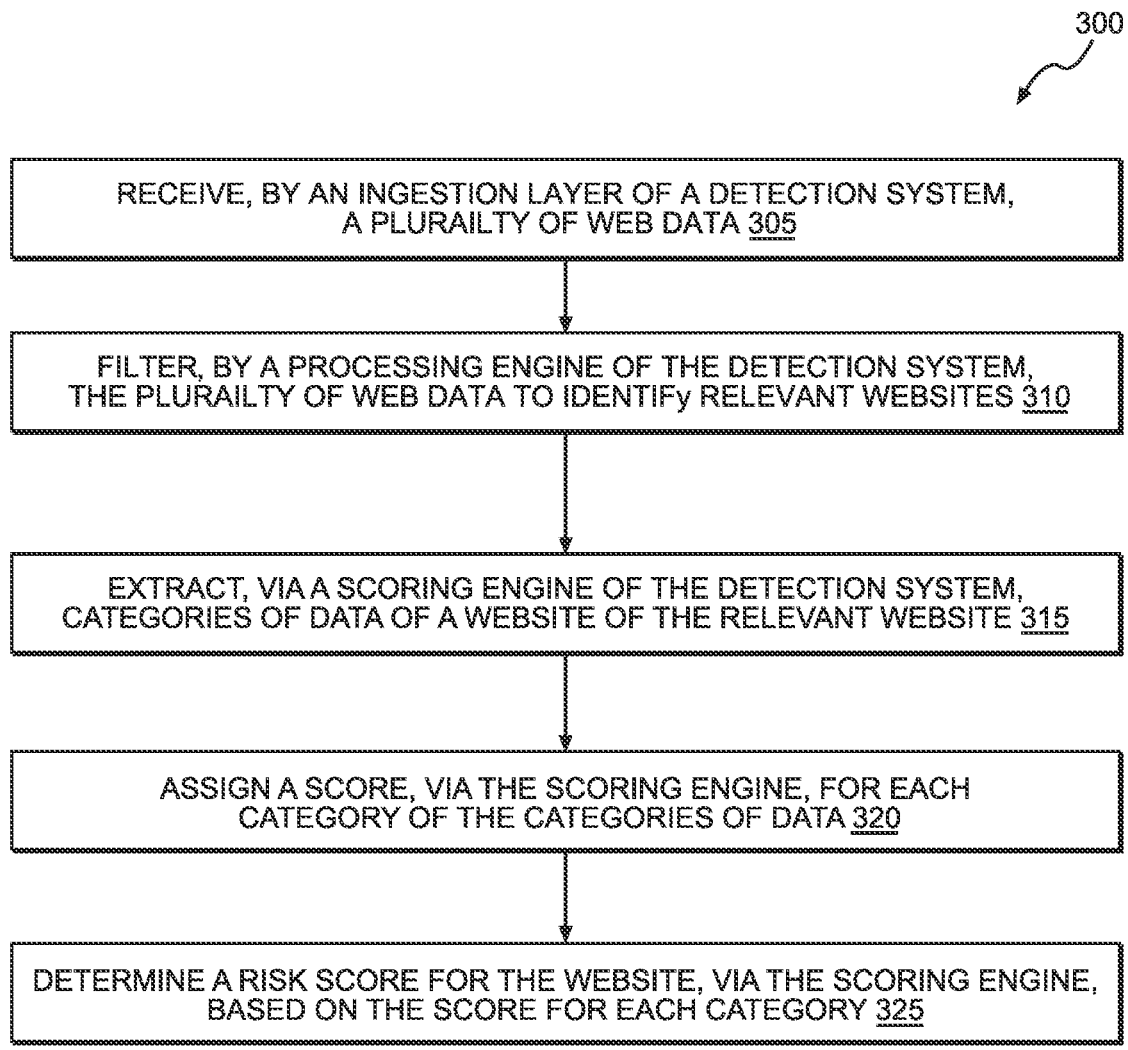
FIG. 3 illustrates a flow chart of a process to detect websites engaging in impersonation activities, according to various embodiments of the present invention.

FIG. 3 illustrates a flow chart of a process to detect websites engaging in impersonation activities, according to various embodiments of the present invention. Process 300 can be performed by an appropriately programmed, computer-implemented detection system 100 of FIG. 1. The process 300 can commence by receiving, at step 305, by an ingestion layer of the detection system, a plurality of web data from the data source 101. The ingestion layer may be similar or identical to ingestion layer 102 of FIG. 1. Once the ingestion layer receives, at step 305, the plurality of web data, which may include websites, URLs, domains, and other metadata associated with websites, then system 200 continues by filtering, at step 310, by a processing engine of the detection system, the plurality of web data to identify relevant websites.

Method 300 can continue by, at step extracting 315, via a scoring engine of the detection system, categories of data of a website of the relevant websites. The scoring engine can be similar to scoring engine 108 of FIG. 1, for example. The data extracted can also include various types, including textual data, images, and metadata. Method 300 can also in various embodiments, assign a score, via the scoring engine, for each category of the categories of data. For example, textual data may be assigned a risk score, images may be assigned other risk scores, while metadata regarding domain registration information may be assigned a third score. In various embodiments, the risk scores can be normalized so that they are on in the same range. In several aspects, each of these scores is assigned a weighting based on perceived risk, e.g., categories that more closely correlate to risk can have a greater weighting than categories with a lesser correlation. The weighting can change over time if the risk correlations change over time. The scores in their weighted or unweighted forms may be averaged or otherwise combined to determine, at step 325, a risk score for the website, via the scoring engine, based on the score for each category. The process 300 of FIG. 3 can be performed for each website in the matched domains, so that a risk score is computed for each website in the matched domains. The detection system 100 can process (e.g., score) the websites in the matched domains simultaneously, in sequence, or according to a combination of the two.

Figure 4:
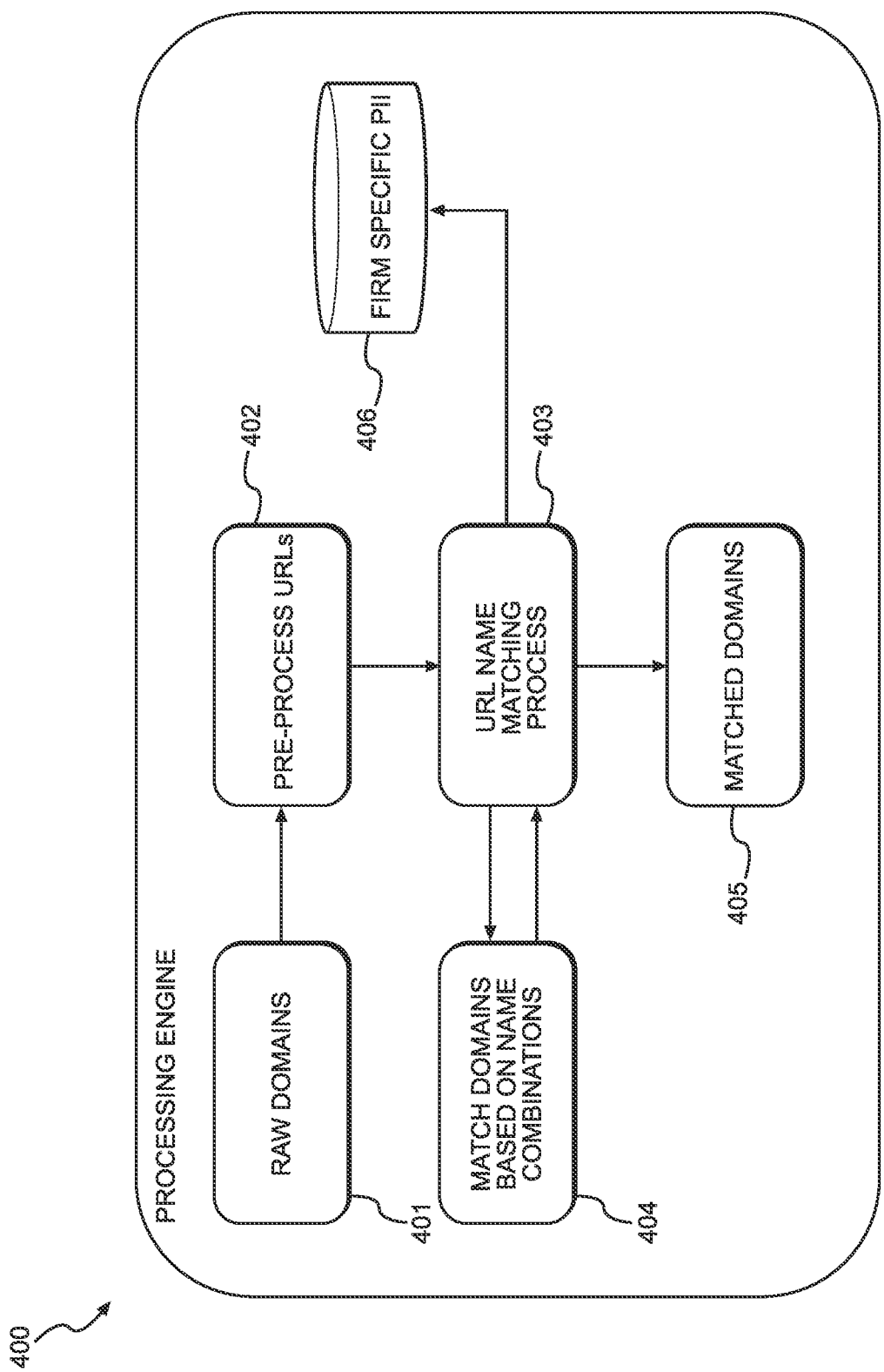
FIG. 4 is a block diagram of methods undertaken in a processing engine of a detection system, according to various embodiments of the present invention.

FIG. 4 is a block diagram of methods undertaken in a processing engine of a detection system, according to various embodiments of the present invention. Processing engine 400 may be part of a detection system, such as detection system 100 of FIG. 1. Raw domains 401 are received by the processing engine 400, for example via an API and stored in a database. In various embodiments, the raw domains 401 are then pre-processed 402 by the processing engine 400 per their URLs, for example, by sorting/ordering raw domains 401 by their URL and name similarity. In various embodiments, the pre-processing 402 can include checking URLs are for any name similarity with at least one database of employees or individuals that could be targets of impersonation. Additionally, in several embodiments, pre-processing 402 can include flagging a URL for other processes in processing engine 400, for example if there is a match or similarity between a URL and a name of a potential target of impersonation, this could include a first name, middle name, last name, or any combination thereof. Furthermore, pre-processing 402 can also check for common URL terms associated or previously associated with a specific industry or with impersonations or fraud and such as websites like 'investwith', 'growingwith' as some of these are connected to impersonated websites in the financial domain.

Once the URLs are pre-processed 402, they are forwarded to be filtered 403 via a filtering component. One example of a filtering component or filtering mechanism is a name matching filter, which is deployed to screen initial batches of preprocessed raw domains 401. This can be done by filtering for similar URL related strings that impersonate the employees of the firm.

For example, if a firm is looking for domains trying to impersonate its employees, the filtering mechanism 403 may include a list at block 404 of strings that are similar or identical to the first and/or last name combinations of employees of the firm. The names of the firm employees can be stored in the database 406. The filter can be set in any way, according to what URLs or domain names the processing engine 400 is designed to capture and what types of domains it is designed to eliminate from the raw domains 401. There can exist various filters that the raw domains must pass, for example a name filter as discussed above, as well as a filter that removes or must match numbers or certain phrases in the URL as well.

The domains that pass the filter (e.g., potentially impersonating domains) are matched domains that can be stored in a data base 405 or passed on to a scoring or analytical engine, for example scoring/analytical engine 108 of FIG. 1. The filter 403 may also use firm specific databases and information, and autonomously update its filtering criteria based on information in the firm or entity's personal information index (PII), which can be stored in the database 406.

Figure 5:
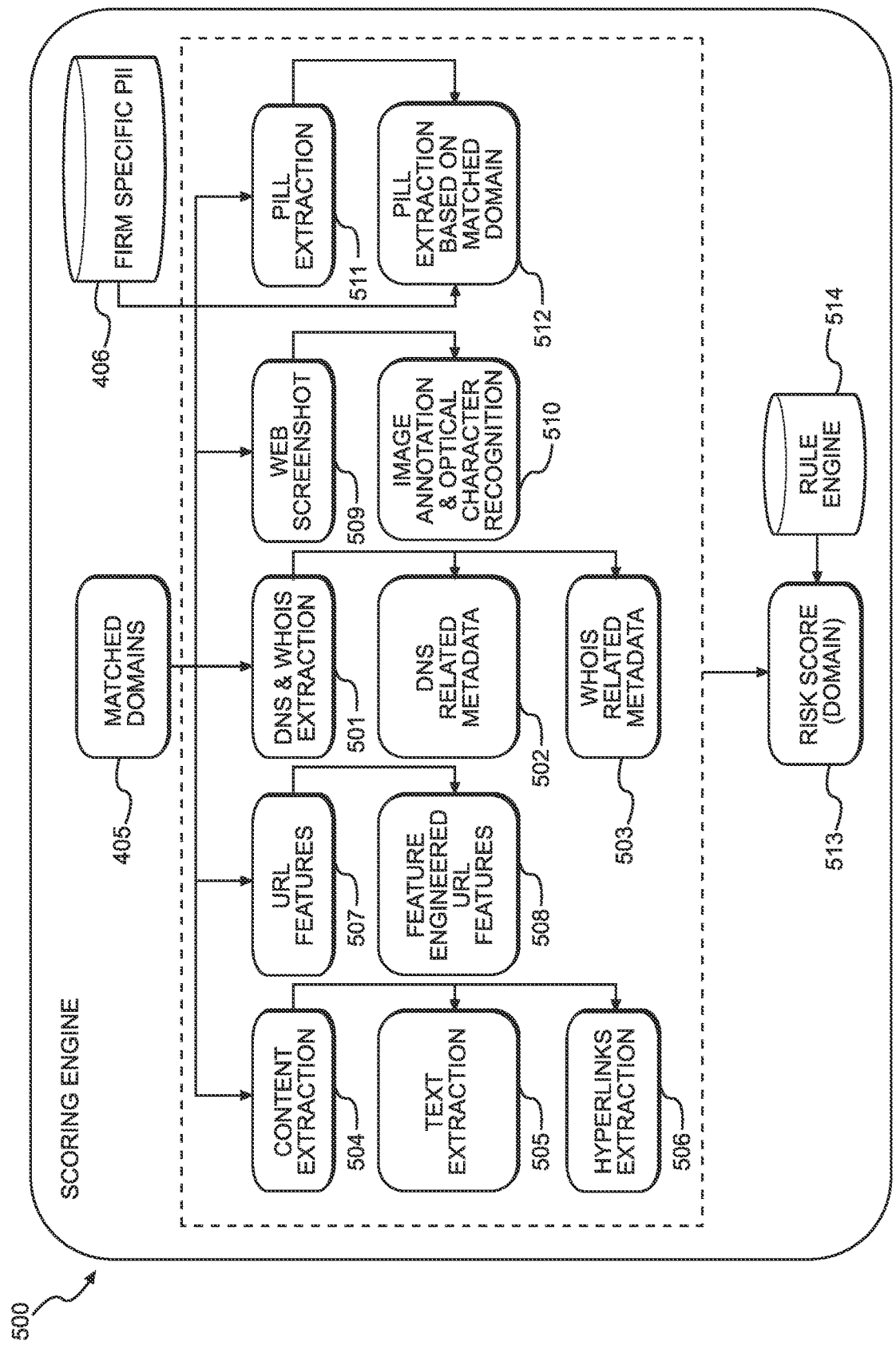
FIG. 5 is a block diagram of methods undertaken in a scoring engine of a detection system, according to various embodiments of the present invention.

FIG. 5 is a block diagram of methods undertaken in a scoring engine of a detection system, such as scoring engine 108 of detection system 100 of FIG. 1, according to various embodiments of the present invention. The scoring engine 500 processes matched domain data 405 and enriches them with metadata information from internet resources, such as WHOIS and DNS (Domain Name System), as well as scraping web content and capturing screenshots of the matched domains. This allows use of multiple features of the matched domains for automatic fraud evidence detection, that can be optimized by the number of API (Application Programming Interface) calls and the processing times for analysis of domains at scale.

The filtered URLs or matched domain data 405 go through the process of information extraction 501 where DNS (Domain Name System) 502, WHOIS 503, Name Servers, Mail Exchange Records and other related metadata for the matched domains are extracted at step 501. The URLs/matched domains 405 are then web scraped at step 504 to get text content 505 and hyperlinks 506 from the matched domains. The scoring engine 500 can look for text or hyperlinks that are important to the relevant industry of the firm, e.g., keyword, which can vary by industry and can change over time. For example, for firms in the financial industry, the keywords or concepts may include Crypto, Financial, Login, terms related to parking pages, social media, or other firm related and other industry regulatory authority information. These keywords and categories are decided based on the industry in question. The keyword analysis is used to determine whether a matched domain is an imposter website, i.e., impersonates an employee of the firm. Matched domains that more heavily feature or use the industry's keywords are more like to be impersonation website. URL features, at step 507, can also be extracted including feature engineered URL features. Different features can be extracted from a URL, for example length of URL, whether there is presence of special characters. Whether there are alphanumeric characters. Whether there is a presence of words like 'growing', 'invest', 'investor' or others related to an industry or domain. Image analysis may also be undertaken by the scoring engine 500, wherein a full-page screenshot 509 is taken with an imaging module and is run through optical character recognition (OCR) module to derive text content 510. The text content is analyzed and scored. Suspicious patterns in the text may be automatically indicated, or automatically annotated based on their position in the image or in the web screenshot to highlight patterns that may be of interest. The image web screenshot may also be used to detect logos in the web page, such as logos of the firm for whom the monitoring is being performed. An OCR module may also be run on a logo on screen to detect text within the logo that may be analyzed for suspicious patterns. For example, a fake website may use a financial firm's logo, and the text analyzed may be one process by which the unauthorized use of the logo may be detected.

Finally, firm specific PII 406 may be used to extract 511 or detect firm specific data from the website/domain 512, its URL, its text content as well as its web screenshot image. Once all the data is collected from the various extracted and scored data sources of each domain 501-512, the data is assessed for risk and is given a risk score 513. The risk score may include weightings that are applied to each one of the data points that were extracted and analyzed, e.g., data points 505, 506, 508, 502, 503, 510 and 512. The risk score can be a weighted average of the scores for each of these data points. A rule engine 514 can be used to continuously update or develop new rules, criteria, weightings, and scoring algorithms that may be developed according to changing and evolving threats, or according to administrative rules developed by administrators of the scoring engine 500.

Figure 6B:
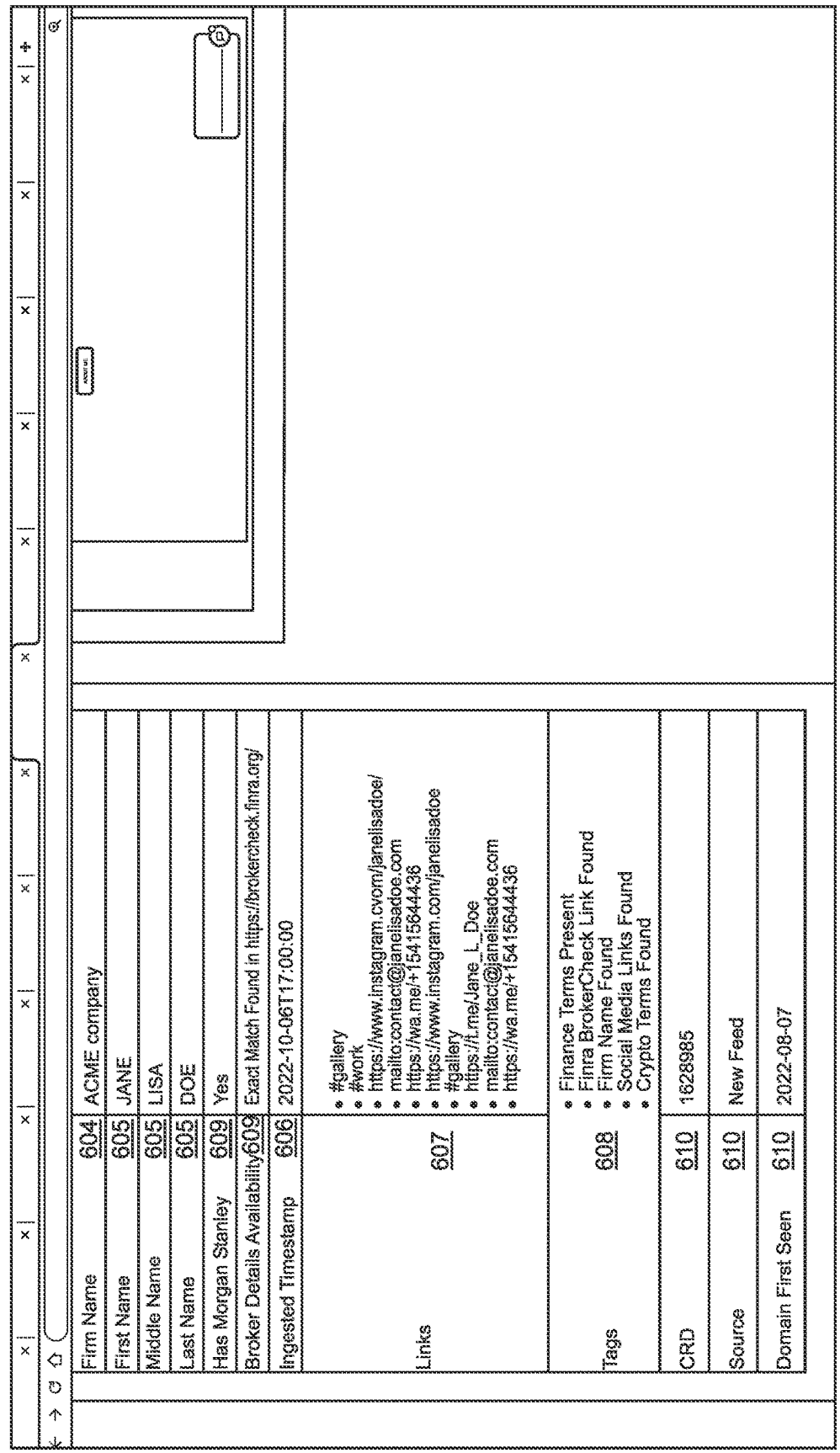

FIGS. 6A-6B illustrate user interfaces of a detection system, according to various embodiments of the present invention. User interface 600 ("UI") can be customizable to display a variety of extracted and analyzed web data to a user. That way, the user can assess whether a takedown notice should be issued for the website and/or some other remedial measure should be taken to mitigate the potential impersonation of a firm employee. For example a calculated risk score 601 may be displayed, this may be a weighted or unweighted risk score calculated by scoring engine 500 of FIG. 5 for example. The domain 602 for the potentially fraudulent website may also be displayed; in this illustrated example, the domain is a first and last name combination of an individual. The action state 603 may also be listed, which may be, for example, notifications that have been sent or takedown actions that have been undertaken may be listed.

User interface 600 can also include the firm name 604, the name of the impersonated victim individual 605, as well as other customizable information 609 for example if the firm is listed on the website, and/or whether the employee or broker details are available online. Other information may include the timestamp 606 the domain was ingested, any links 607 extracted from the domain, any tags 608 extracted from the domain, as well as WHOIS and DNS related metadata 610 that was extracted. A screenshot 611 of the website may also be provided which may include annotations, depending on the customization of the UI 600.

The detection system 100 can also capture the information, such as the information shown in the UI of FIG. 6, for the potentially fraudulent website in an electronic file as evidence for a takedown action or notification.

Figure 7:
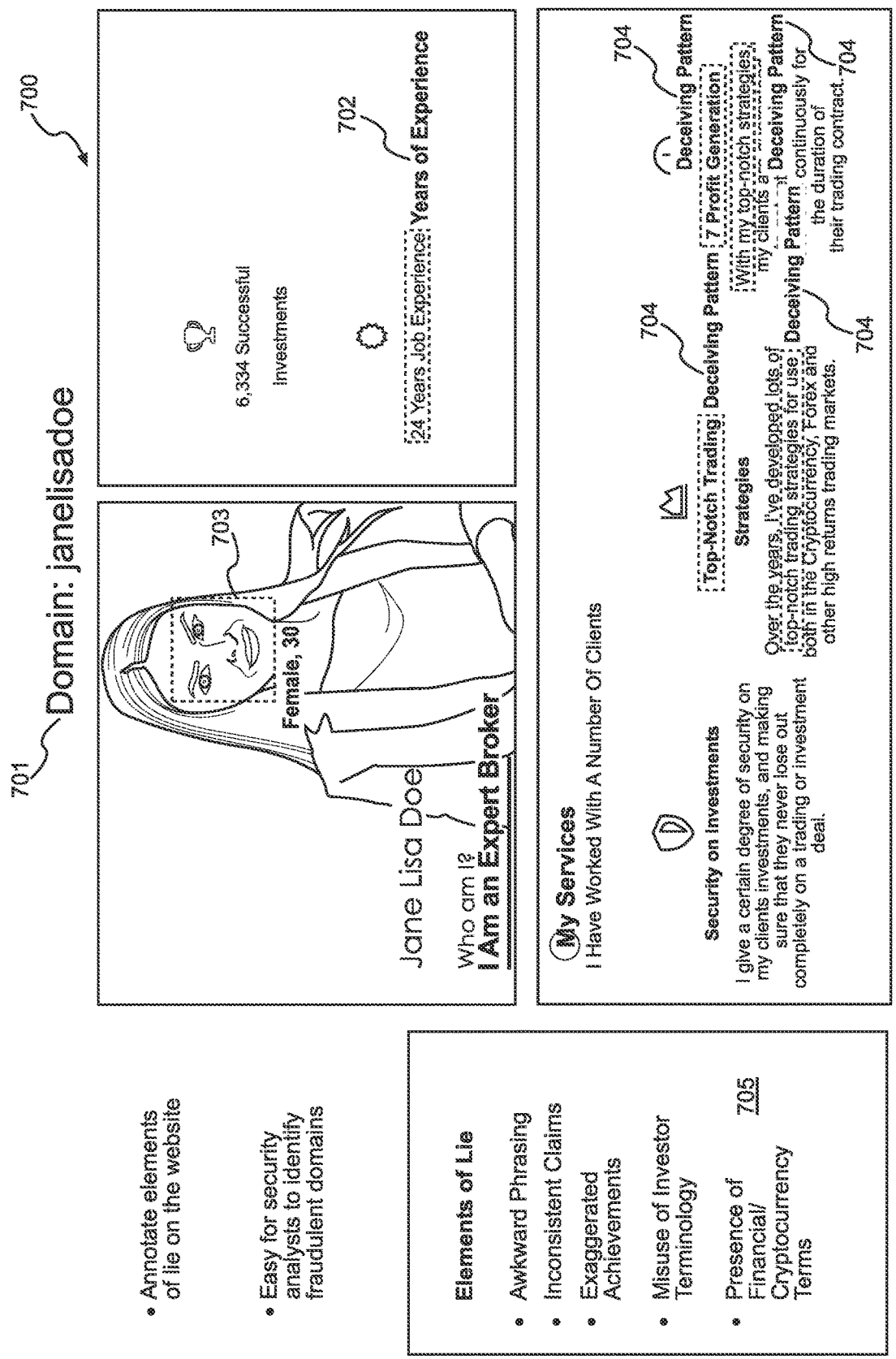
FIG. 7 illustrates an example of annotations of suspicious patterns on a website, according to various embodiments of the present invention.

FIG. 7 illustrates an example of annotations of suspicious patterns on a website, according to various embodiments of the present invention. The annotated screenshot 700 can include a screenshot of a website that has been designated as having suspicious patterns, the screenshot is then autonomously and automatically annotated to produce the annotated screenshot 700. The annotated screenshot 700 can include highlighting produced by system 100, FIG. 1, and in various embodiments, by scoring engine 108, FIG. 1, 500, FIG. 5. The annotations may include highlighting including the domain 701, and information about the individual being impersonated 702, for example the years of experience that is listed on the website. Annotations and highlighting may also include the face or image of individual 703 along with information on their physical attributes, such as information about their real age compared to the age listed on the website, their ethnicity and the like. Finally there may be other suspicious patterns 704 that are highlighted, including keywords, indicators of specific industries, and business terms that are indicators that the impersonation is being undertaken to lure potential victims. Finally an overview or summary section 705 may be generated that lists the suspicious patterns of concern.

Figure 8:
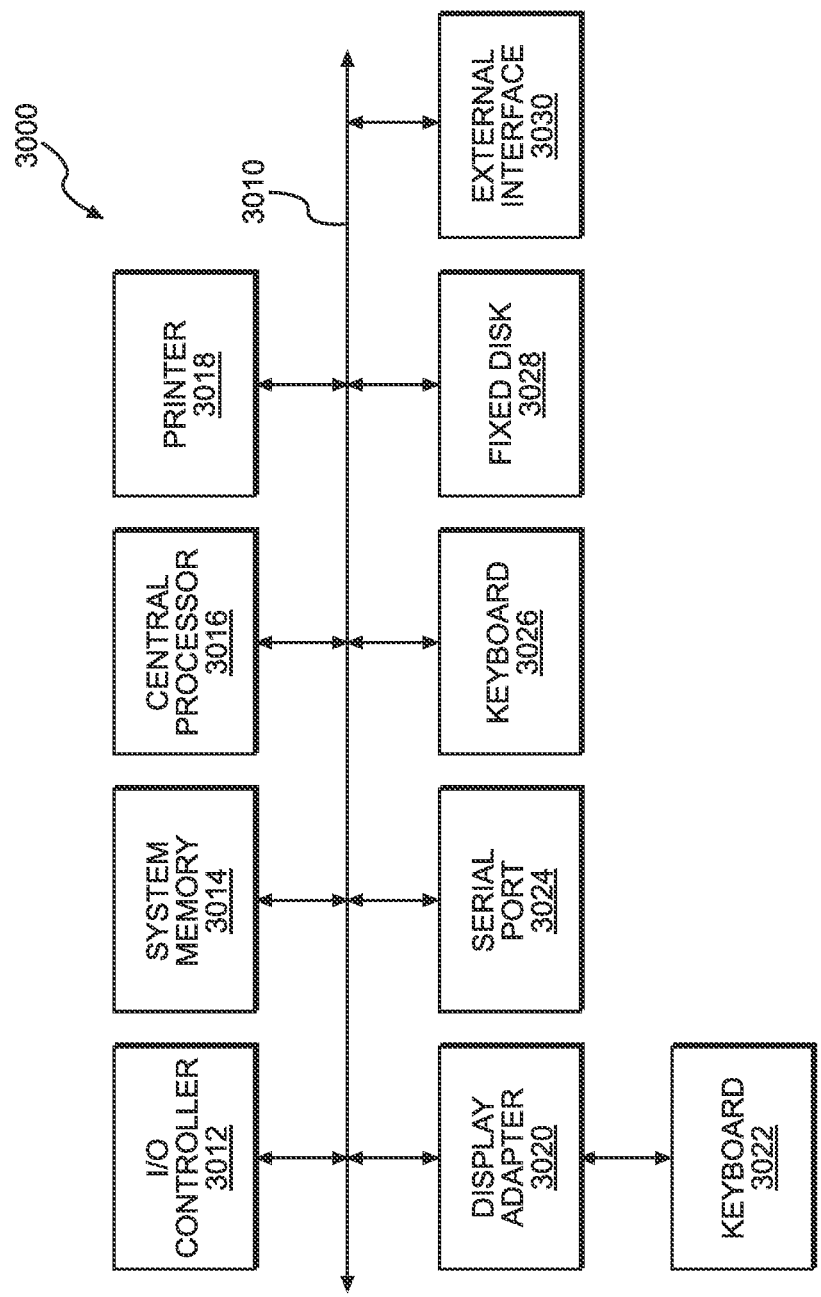
FIG. 8 is a block diagram of a computer apparatus with data processing subsystems or components, according to at least one aspect of the present disclosure.

FIG. 8 is a block diagram of a computer apparatus 3000 with data processing subsystems or components, according to at least one aspect of the present disclosure. The computer apparatus 300 may be used to implement the computer(s) of the detection system 100. The subsystems shown in FIG. 8 are interconnected via a system bus 3010. Additional subsystems such as a printer 3018, keyboard 3026, fixed disk 3028 (or other memory comprising computer readable media), monitor 3022, which is coupled to a display adapter 3020, and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer readable medium.

Examples of the systems and methods according to various aspects of the present disclosure are provided below in the following numbered clauses. An aspect of the method may include any one or more than one, and any combination of, the numbered clauses described below.

Clause 1. A method for detecting human impersonations on the internet, comprising: receiving, by an ingestion layer of a detection system, a plurality of web data; filtering, by a processing engine of the detection system, the plurality of web data to identify relevant websites; extracting, via a scoring engine of the detection system, categories of data of a website of the relevant websites; assigning a score, via the scoring engine, for each category of the categories of data; and determining a risk score for the website, via the scoring engine, based on the score for each category.

Clause 2. The method of clause 1, further comprising: assigning a weighting, via the scoring engine, for each category of the categories of data to derive a weighted score for each category; and determining a final risk score for the website, via the scoring engine, based on the weighted score for each category.

Clause 3. The method of clause 1 wherein the filtering comprises deleting data of irrelevant websites from the web data.

Clause 4. The method of clause 1, wherein the filtering comprises matching web data URLs with predetermined string combinations.

Clause 5. The method of clause 1 further comprising: categorizing each website of the relevant websites into a specific domain based on the extracted categories of data.

6. The method of clause 1, wherein the extracting of categories of data comprises at least one of: extracting content, via the scoring engine of the detection system, from the website, wherein the content can comprise text information, extracting URL features, via the scoring engine, from the website, extracting domain metadata, via the scoring engine, from the website, and extracting firm-related data, via the scoring engine of the detection system, from the website.

7. The method of clause 1 further comprising: screenshotting, a page of the website, to extract a full-page screenshot image of the page.

8. The method of clause 9, further comprising: extracting text information from the full-page screenshot image via optical character recognition.

9. The method of clause 8, further comprising: analyzing at least one of the text information, the full-page screenshot image, or extracted content to determine suspicious patterns.

10. The method of clause 9, further comprising: determining a logo on the page based on the full-page screenshot image.

11. The method of clause 9, further comprising: automatically annotating suspicious patterns on the full-page screenshot based on the analyzing.

12. The method of clause 1, further comprising: upon a determination that the risk score for the website is above a threshold value, generating, automatically, by the detection system, evidence for a takedown notice for the website.

13. A detection system for identifying suspicious websites, the system comprising: A plurality of databases; a processor in communication with a memory, the memory comprising instructions, causing the processor to: receive, by an ingestion layer of the detection system, a plurality of web data; filter, by a processing engine of the detection system, the plurality of web data to identify relevant websites; extract, via a scoring engine of the detection system, categories of data from a website of the relevant websites; assign a score, via the scoring engine, for each category of the categories of data; and determine a risk score for the website, via the scoring engine, based on the score for each category.

14. The system of clause 13, wherein the processor, is further caused to: store the plurality of web data into a first database of the plurality of databases.

15. The system of clause 13, wherein the processor, is further caused to: store the risk score of the website into a second database of the plurality of databases.

16. The system of clause 13 wherein the filtering comprises deleting data of irrelevant websites from the web data.

17. The system of clause 13, wherein the extracting of categories of data comprises at least one of: extract content, via the scoring engine of the detection system, from the website, extract URL features, via the scoring engine, from the website, extract domain metadata, via the scoring engine, from the website, and extract firm-related data, via the scoring engine of the detection system, from the website.

18. The system of clause 13, wherein filtering comprises at least one of deleting data of irrelevant websites from the web data, or matching web data URLs with predetermined string combinations.

19. The system of clause 13, wherein the memory comprises instructions to further cause the processor to: screenshot, a page of the website, to extract a full-page screenshot image of the page; extract text information from the full-page screenshot image via optical character recognition; analyze at least one of the text information, the full-page screenshot image, or extracted content to determine suspicious patterns; and automatically annotate suspicious patterns on the full-page screenshot based on the analyzing.

20. A non-transitory computer-readable storage medium having embodied thereon a program, the program executable by a processor to perform a method for detecting fraudulent websites, comprising: receiving, by an ingestion layer of a detection system, a plurality of web data; filtering, by a processing engine of the detection system, the plurality of web data to identify relevant websites; extracting content, via a scoring engine of the detection system, from the website; extracting URL features, via the scoring engine, from the website; extracting domain metadata, via the scoring engine, from the website; extracting firm-related data, via the scoring engine of the detection system, from the website; and analyzing at least one of the content, URL features, domain metadata, or the firm-related data, to determine risk assessment of the website.

21. The non-transitory computer-readable storage medium, wherein the program executable by the processor further comprises: screenshotting, a page of the website, to extract a full-page screenshot image of the page; extracting text information from the full-page screenshot image via optical character recognition; analyzing at least one of the text information, the full-page screenshot image, or extracted content to determine suspicious patterns; and automatically annotating suspicious patterns on the full-page screenshot based on the analyzing.

The foregoing detailed description includes references to the accompanying drawings, which form a part of the detailed description. The drawings show illustrations in accordance with exemplary aspects. These example aspects, which are also referred to herein as "examples," are described in enough detail to enable those skilled in the art to practice the present subject matter.

The various aspects described above, are presented as examples only, and not as a limitation. The descriptions are not intended to limit the scope of the present technology to the forms set forth herein. To the contrary, the present descriptions are intended to cover such alternatives, modifications, and equivalents as may be included within the scope of the present technology as appreciated by one of ordinary skill in the art.

While specific aspects of, and examples for, the system are described above for illustrative purposes, various equivalent modifications are possible within the scope of the system, as those skilled in the relevant art will recognize. For example, while processes or steps are presented in a given order, alternative aspects may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

The aspects can be combined, other aspects can be utilized, or structural, logical, and electrical changes can be made without departing from the scope of what is claimed. It will be further understood by those within the art that typically a disjunctive word, and/or phrase presenting two or more alternative terms, whether in the description, claims, or drawings, should be understood to contemplate the possibilities of including one of the terms, either of the terms, or both terms unless context dictates otherwise. The detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference, and the disclosure expressly set forth in the present application controls.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one", and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one", and indefinite articles such as "a" or "an" (e.g., "a", and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A, and B together, A, and C together, B, and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A, and B together, A, and C together, B, and C together, and/or A, B, and C together, etc.).

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited in the form disclosed. Many modifications and variations will be apparent to those of ordinary skill in the art without departing from the scope of the claimed subject matter. Exemplary aspects were chosen and described to best explain the principles of the present technology and its practical application, and to enable others of ordinary skill in the art to understand the various aspects of the present disclosure with various modifications as are suited to the particular use contemplated.

What is claimed is:

1. A method for detecting human impersonations of known individuals on websites on the internet, wherein the known individuals are associated with an organization, the method comprising:
   receiving, by an ingestion layer of a detection system, a plurality of web data for the websites;
   filtering, by a processing engine of the detection system, the plurality of web data to identify relevant websites, wherein the filtering comprises identifying websites as relevant websites that include person-specific information matching records of one or more of the known individuals;
   extracting, via a scoring engine of the detection system, categories of data of a website of the relevant websites, wherein at least one category of data includes structured personal identifiers extracted from the website that are compared against a known profile for each of the one or more known individuals;
   assigning a score, via the scoring engine, for each category of the categories of data; and
   determining a risk score for the website, via the scoring engine, based on the score for each category, wherein the risk score indicates a likelihood that the website impersonates at least one of the known individuals.

2. The method of claim 1, further comprising:
   assigning a weighting, via the scoring engine, for each category of the categories of data to derive a weighted score for each category; and
   determining a final risk score for the website, via the scoring engine, based on the weighted score for each category.

3. The method of claim 1 wherein the filtering comprises deleting data of irrelevant websites from the web data.

4. The method of claim 1, wherein the filtering comprises matching web data URLs with predetermined string combinations, wherein the predetermined string combinations include name combinations of the known individuals.

5. The method of claim 1 further comprising:
   categorizing each website of the relevant websites into a specific domain based on the extracted categories of data.

6. The method of claim 1, wherein the extracting of categories of data comprises at least one of:
   extracting content, via the scoring engine of the detection system, from the website, wherein the content can comprise text information,
   extracting URL features, via the scoring engine, from the website,
   extracting domain metadata, via the scoring engine, from the website, and
   extracting firm-related data, via the scoring engine of the detection system, from the website.

7. The method of claim 1 further comprising:
   screenshotting, a page of the website, to extract a full-page screenshot image of the page.

8. The method of claim 7, further comprising:
   extracting text information from the full-page screenshot image via optical character recognition.

9. The method of claim 8, further comprising:
   analyzing at least one of the text information, the full-page screenshot image, or extracted content to determine suspicious patterns.

10. The method of claim 9, further comprising:
    determining a logo on the page based on the full-page screenshot image.

11. The method of claim 9, further comprising:
    automatically annotating suspicious patterns on the full-page screenshot based on the analyzing.

12. The method of claim 1, further comprising:
    upon a determination that the risk score for the website is above a threshold value, generating, automatically, by the detection system, evidence for a takedown notice for the website.

13. A detection system for identifying websites on the internet that impersonate known individuals associated with an organization, the system comprising:
    a plurality of databases;
    a processor in communication with a memory, the memory comprising instructions, causing the processer to:
      receive, by an ingestion layer of the detection system, a plurality of web data for the websites;
      filter, by a processing engine of the detection system, the plurality of web data to identify relevant websites by identifying websites as relevant websites that include person-specific information matching records of one or more of the known individuals;
      extract, via a scoring engine of the detection system, categories of data from a website of the relevant websites, wherein at least one category of data includes structured personal identifiers extracted from the website that are compared against a known profile for each of the one or more known individuals;
      assign a score, via the scoring engine, for each category of the categories of data; and
      determine a risk score for the website, via the scoring engine, based on the score for each category, wherein the risk score indicates a likelihood that the website impersonates at least one of the known individuals.

14. The system of claim 13, wherein the processor, is further caused to:
    store the plurality of web data into a first database of the plurality of databases.

15. The system of claim 13, wherein the processor, is further caused to:
    store the risk score of the website into a second database of the plurality of databases.

16. The system of claim 13, wherein the processor is configured to filter by deleting data of irrelevant websites from the web data.

17. The system of claim 13, wherein the extracting of categories of data comprises at least one of:
    extract content, via the scoring engine of the detection system, from the website,
    extract URL features, via the scoring engine, from the website,
    extract domain metadata, via the scoring engine, from the website, and
    extract firm-related data, via the scoring engine of the detection system, from the website.

18. The system of claim 13, wherein filtering comprises at least one of deleting data of irrelevant websites from the web data, or matching web data URLs with predetermined string combinations.

19. The system of claim 13, wherein the memory comprises instructions to further cause the processor to:
    screenshot, a page of the website, to extract a full-page screenshot image of the page;
    extract text information from the full-page screenshot image via optical character recognition;

analyze at least one of the text information, the full-page screenshot image, or extracted content to determine suspicious patterns; and automatically annotate suspicious patterns on the full-page screenshot based on the analyzing.

20. A non-transitory computer-readable storage medium having embodied thereon a program, the program executable by a processor to perform a method for detecting websites on the internet that impersonate known individuals associated with an organization, comprising:

receiving, by an ingestion layer of a detection system, a plurality of web data for the website;

filtering, by a processing engine of the detection system, the plurality of web data to identify relevant websites, wherein the filtering comprises identifying websites as relevant websites that include person-specific information matching records of one or more of the known individuals;

filtering, by a processing engine of the detection system, the plurality of web data to identify relevant websites, wherein the filtering comprises identifying websites as relevant websites that include person-specific information matching records of one or more of the known individuals;

extracting content, via a scoring engine of the detection system, from a website of the relevant websites, wherein the content comprises categories of data of the website, wherein at least one category of data includes structured personal identifiers extracted from the website that are compared against a known profile for each of the one or more known individuals;

assigning a score, via the scoring engine, for each category of the categories of data; and determining a risk score for the website, via the scoring engine, based on the score for each category, wherein the risk score indicates a likelihood that the website impersonates at least one of the known individuals.

21. The non-transitory computer-readable storage medium of claim 20, wherein the program executable by the processor further comprises:

screenshotting, a page of the website, to extract a full-page screenshot image of the page;

extracting text information from the full-page screenshot image via optical character recognition;

analyzing at least one of the text information, the full-page screenshot image, or extracted content to determine suspicious patterns; and automatically annotating suspicious patterns on the full-page screenshot based on the analyzing.

\* \* \* \* \*